United States Patent [19]
Darcie et al.

[11] Patent Number: 5,574,584
[45] Date of Patent: Nov. 12, 1996

[54] WAVELENGTH DIVISION MULTIPLEXING PASSIVE OPTICAL NETWORK WITH BI-DIRECTIONAL OPTICAL SPECTRAL SLICING

[75] Inventors: Thomas E. Darcie; Nicholas J. Frigo, both of Monmouth; Patrick P. Iannone, Middlesex, all of N.J.

[73] Assignee: Lucent Technologies Inc., Murray Hill, N.J.

[21] Appl. No.: 595,816

[22] Filed: Mar. 22, 1996

Related U.S. Application Data

[63] Continuation of Ser. No. 326,576, Oct. 20, 1994, abandoned.

[51] Int. Cl.$^6$ .................................................. H04J 14/02
[52] U.S. Cl. ........................... 359/125; 359/127; 359/168
[58] Field of Search ........................................ 359/113, 125, 359/137, 135, 145, 124, 127, 168, 121

[56] References Cited

U.S. PATENT DOCUMENTS

| | | | |
|---|---|---|---|
| 5,046,807 | 9/1991 | Unitt | 359/113 |
| 5,119,223 | 6/1992 | Panzer et al. | 359/135 |
| 5,212,579 | 5/1993 | Huber et al. | 359/145 |
| 5,221,983 | 6/1993 | Wagner | 359/125 |
| 5,241,409 | 8/1993 | Hill et al. | 359/117 |
| 5,272,556 | 12/1993 | Faulkner et al. | 359/125 |
| 5,285,305 | 2/1994 | Cohen et al. | 359/137 |
| 5,323,255 | 6/1994 | Sievens et al. | 359/135 |

FOREIGN PATENT DOCUMENTS

| | | | |
|---|---|---|---|
| 9312624 | 6/1993 | WIPO | 359/137 |

OTHER PUBLICATIONS

Wagner et al.,"Technology and System Issues for a WDM-Based Fiber Loop Architecture", *Journal of Lightwave Technology*, vol. 7, No. 11, pp. 1759–1769 Nov. 1989.

Kaiser, "Single–Mode Fiber Technology in the Subscriber Loop Environment", *Afternoon MD*, Jan. 19, 1987.

Electronic Letters "Use of a Fibre Loop Reflector as Downstream Receiver and Upstream Modulator" vol. 26, No. 6, pp. 827–828.

Photonics Technology Letters, "Integrated Optics N×N Multiplexer on Silicon", Oct. 1991, vol. 3, No. 10.

Electronic Letters "Experimental Demonstration of a Passive Optical Subscriber Loop Architecture" vol. 24, No. 6, pp. 344–345.

Electronic Letters "Led Spectral Slicing for Single–Mode Local Loop Applications" vol. 24, No. 7, pp. 389–390.

Electronic Letters "Passive Optical Local Networks for Telephony Applications and Beyond" vol. 23, No. 24, pp. 1255–1257.

Proc 2 Annu Broadband Expo 14 Fiber Opt Comm Local Area Network Expo Broad Band 90. "Bi–Directional Broadband Local Network Evolution" pp. 314–318.

BT Technical Journal Apr. 1993, "Inpact of New Optical Technology on Spectrally–Sliced" pp. 46–55.

C. Dragone, "An N×N Optical Multiplexer Using a Planar Arrangement of Two Star Couplers", IEEE Photonics Technology Letters, vol. 3, No. 9, pp. 812–185, Sep. 1991.

*Primary Examiner*—Leo Boudreau
*Assistant Examiner*—Bhavesh Mehta

[57] ABSTRACT

A passive optical network is provided that spectrally slices optical signals transmitted in both upstream and downstream directions utilizing wavelength division multiplexing routing. The passive optical network preferably includes an incoherent signal source at both ends to provide signals that are spectrally sliced according to optical frequency. The downstream information may be transmitted in a conventional data format. The upstream transmissions may be segregated by subcarrier multiplexing, time scheduling or wavelength division multiplexing.

19 Claims, 6 Drawing Sheets

FIG. 7A 0.00000 s          50.000 ns          100.000 ns
         10.0 ns/div    REALTIME

FIG. 7B 0.00000 s          50.000 ns          100.000 ns
         10.0 ns/div    REALTIME

WAVELENGTH DIVISION MULTIPLEXING PASSIVE OPTICAL NETWORK WITH BI-DIRECTIONAL OPTICAL SPECTRAL SLICING

This application is a continuation of application Ser. No. 08/326,576, filed on Oct. 20, 1994, now abandoned.

BACKGROUND OF THE INVENTION

1. Field of the Invention

The present invention relates to a wavelength-division multiplexing passive optical network that utilizes bi-directional, optical spectral slicing for two-way transmission.

2. Description of the Related Art

Passive optical networks require no active components for directing optical signals between a central office or host digital terminal, and a network subscriber's terminal equipment. Passive optical networks, therefore, require no power or processing in the field to direct optically encoded information to its destination. Typically, a passive optical network includes a first fiber star formed as a plurality of optical paths extending from the central office to a remote node. Downstream optical signals are transmitted from the central office to the remote node, where the signal is passively split and distributed to one of a plurality of units of network subscriber equipment. The network units may transmit optically encoded signals upstream to the remote node to form a multiplexed signal for distribution to the central office. Lasers are generally used to generate light used to form the transmitted light signals.

SUMMARY OF THE INVENTION

The present invention provides a wavelength division multiplexing passive optical network which utilizes incoherent light sources (e.g., LEDs) at both upstream and downstream transmitting locations. More particularly, the passive optical network of this invention includes a central office or host computer in optical communication with one or more optical network units wherein both the central office and optical network units contain broadband incoherent sources and receivers for transmitting/receiving optical data. Optical data is routed to/from the optical network units via an optical routing coupler located at a remote node, a wavelength division multiplexer (WDM) or preferably, a wavelength division multiplexing router (WDM/R). The wavelength division multiplexing router spectrally slices and distributes received light by wavelength, or, spectrally combines selected portions of the broadband spectrum, depending on broadcast direction. The upstream and downstream signal sources may transmit at separate wavelength bands, e.g., 1.31 µm and 1.5 µm, respectively.

Due to the varying distances between the remote node and the optical network units, collisions at the central office among the various received signals are possible. These collisions are avoided within the invention by either scheduling (time segregation) of optical network transmissions (i.e., time division multiplexing TDM) or subcarrier multiplexing (SCM) or wavelength division multiplexing. The optical network may be implemented in either a single-fiber or dual-fiber configuration. In the single-fiber configuration, a single fiber is used to optically connect the central office to the remote node, and to optically connect the remote node to each optical network unit. In the dual-fiber configuration, separate fibers for upstream and downstream transmission at both ends of the remote node are employed.

Downstream information, i.e., optical information provided by the central office, transmitted with a broadband source such as an LED or an erbium-doped fiber amplifier, in lieu of a conventional multi-wavelength source, such as a laser, offers several advantages. First, spectral slicing of a signal generated within a broadband signal source permits transmitting in a broadcast mode. One advantage of LEDs is that they are a more mature technology and therefore more cost effective than lasers. Accordingly, sources and detectors are readily available at present for deployment as an FTTH for low cost. By using LEDs at both ends of a passive optical network, technological implementation can take place now without the need to wait for development of economical multiwavelength sources. Finally, implementation of the present network is compatible with RITE-Net™ and LAR-NET™ design for compatibility with future upgrades.

DETAILED DESCRIPTION

Figure 1:
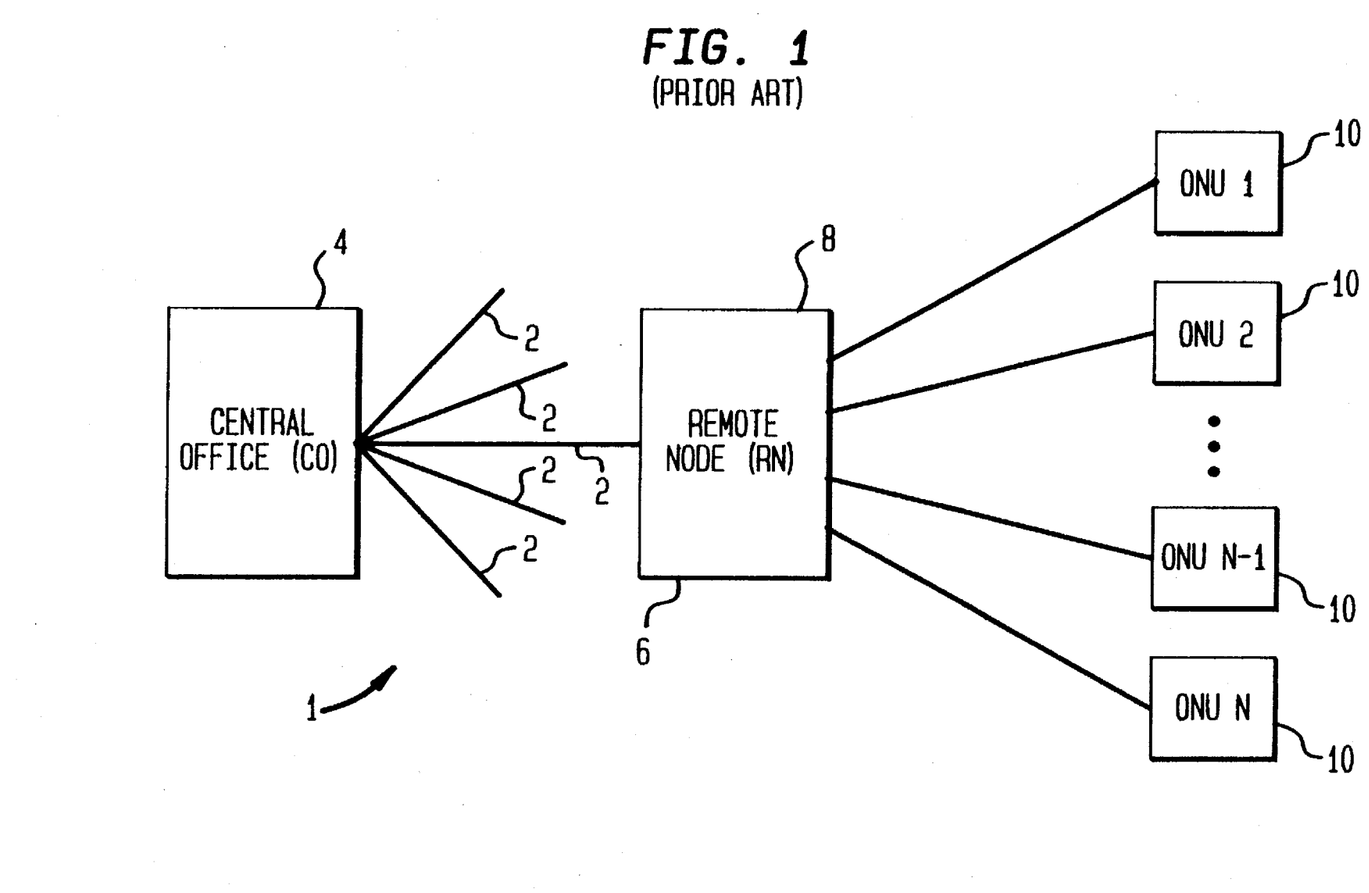
FIG. 1 illustrates a standard passive optical network model consisting of a first fiber star.

A standard passive optical network model is shown in FIG. 1, consisting of a first fiber star 1, typically a plurality of optical fibers 2 extending from a central office 4, to one of a plurality of remote nodes 6, i.e., $RN_1, RN_2, \ldots RN_N$. Downstream signals are transmitted from the central office towards the remote node for further distribution. At the remote nodes, light is passively split and distributed via a plurality of optical fibers 8 (a second star) to a plurality of optical network units 10, i.e., $ONU_1, ONU_2, \ldots ONU_N$. The optical network units provide service to one or more end users wherein each downstream optical signal is received and electronically distributed to end users. The optical network units 10 may transmit upstream signals which are combined at the remote node. Each remote node 6 (or passive star) passively combines transmissions from the optical network units 10 onto single optical fiber 2 for distribution to the central office. Stern, et at., PASSIVE OPTICAL LOCAL NETWORKS FOR TELEPHONE APPLICATIONS AND BEYOND, ELECTRON LETTERS, vol. 23, pgs. 1255–57 (1987).

Two passive optical network architectures which will be discussed herein are telephony over passive optical networks (TPON) and wavelength division multiplexing passive optical networks (WDM PONs). In a TPON architecture, a central office broadcasts a downstream optical signal to all optical network units using time-division multiplexing (TDM) protocol. A laser with a common wavelength band, requiring synchronization, may also be used. TDM typically includes a frame of information subdivided into time slots assigned to individual optical network units. Wavelength division multiplexing passive optical networks utilize an architecture within which each optical network unit or subscriber is assigned a unique wavelength by the central office. Signals destined for each remote node (and ultimately, each optical network unit) are created by modulating light at N distinct wavelengths at the central office. The modulated light is multiplexed onto a fiber directed to the remote node. The downstream signals are split and distributed to the optical network unit as a function of wavelength within a wavelength division demultiplexer (WDM) at the remote node. In the upstream transmission direction (optical network unit to remote node), the light is transmitted at assigned wavelengths, typically by laser.

RITE-Net™ is one type of wavelength division multiplexing passive optical network that uses a wavelength division multiplexing router (WDM/R) at the remote node, which distinguishes it from a conventional wavelength division multiplexing passive optical network. Wavelength division multiplexing router couplers are described in a paper by Dragone, An N×N Optical Multiplexer Using a Planar Arrangement of Two Star Couplers, *IEEE Phot. Technol. Lett* Vol. 3, No. 9, pp. 812–815, September, 1991. Within the RITE-Net™ architecture, a multiwavelength laser at the central office sends multiplexed optical signals encoded with data at specific wavelengths to the remote node. At the remote node, the downstream signals are routed by the wavelength division multiplexing router according to wavelength to the optical network units. The separation between frequencies of the WDM/R (mode spacing) sets the system's channel spacing. The central office transmitter is designed such that its mode spacing closely matches that of the WDM/R. An electronic sequencer and a control circuit define the central office transmitter wavelength and insure that data signals modulate the transmitter when lasing at particular wavelengths. At the optical network unit, a portion of the received light is overmodulated with subscriber data and looped back through the remote node to the central office. That is, a modulator at the optical network unit imprints upstream information on a CW portion of the downstream signal which is then directed back to the remote node. Such a network is referred to as a RITE-Net™ network, as described in commonly-owned U.S. patent application Ser. No. 08/029,724, filed Mar. 1, 1993, and incorporated herein by reference.

In LAR-Net™, another wavelength division multiplexing passive optical network, the need for the RITE-Net™ modulator at the ONU is avoided. Multi-frequency signals are sent from the central office (where a multi-frequency signal source and receiver are located) over single fibers to a remote node for routing by wavelength to different optical network units. A coupler at the optical network unit combines/separates upstream and downstream traffic, directing the downstream traffic to a receiver. A broadband incoherent signal source, such as an LED, is provided for transmitting upstream communications, replacing the RITE-Net™ modulators. The upstream signal is spectrally sliced at the remote node (i.e., the wavelength division multiplexing router) into appropriate wavelength bands to prevent spectral overlap of upstream signals. LAR-Net™ network is described in commonly-owned U.S. patent application Ser. No. 08/261,5844, filed Jun. 17, 1994, and incorporated herein by reference.

Variations on the Zirngibl method have been implemented. Reeve et al., LED Spectral Slicing for Single-mode Local Loop Applications, Electronic Letters, vol. 24, no. 7, pgs. 389–90 (1988), discloses a system within which each subscriber receives a dedicated wavelength channel comprising different wavelength slices from the spectrum of identical LEDs. The system utilizes two wavelength division multiplexing couplers to implement the spectral slicing. A second variation is disclosed by Wagner et al., Experimental Demonstration of a Passive Optical Subscriber Loop Architecture, Electronic Letters, vol. 24, no. 6, pgs. 244–45 (1988). A system is disclosed therein that employs multichannel wavelength division multiplexing technique to provide each subscriber with a dedicated channel to/from the central office. Transmission has been found to be successful at received levels of −55 dBm.

Figure 2:
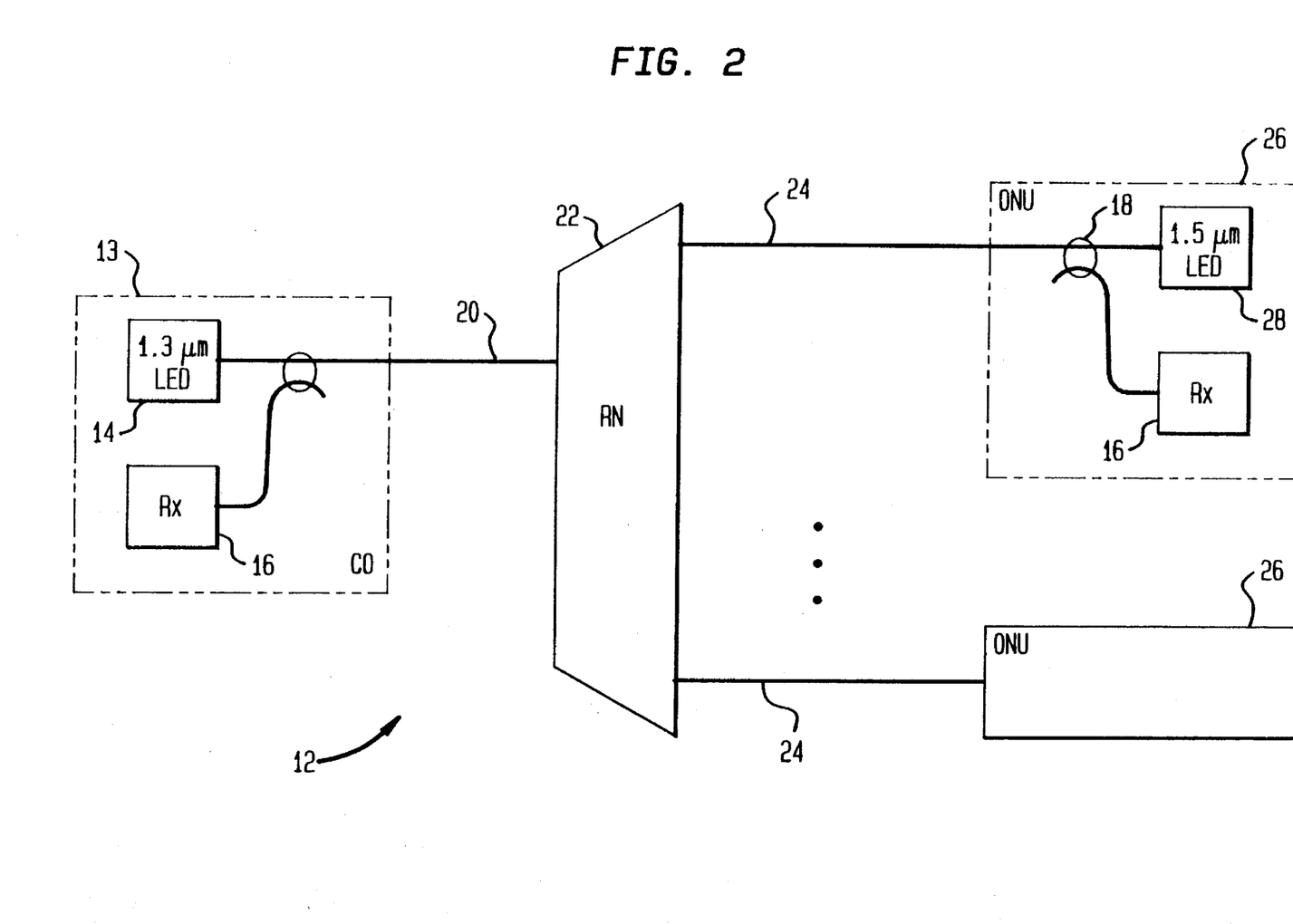
FIG. 2 illustrates one embodiment of a wavelength division multiplexing passive optical network in accordance with the present invention.

One embodiment of a wavelength division multiplexing passive optical network with bi-directional optical spectral splicing 12 of this invention is shown in FIG. 2. Passive optical network 12 includes a central office 13 connected by a single fiber 20 to a remote node 22. Remote node 22 includes a wavelength router, preferentially, one such as the wavelength division multiplexing router (WDM/R) discussed above, which wavelength slices the downstream signal transmitted from central office 13. The sliced portions of the downstream signal are distributed along single fibers 24, to each of a number of optical network units 26. The central office 13 and each of the optical network units 26 contain coarse wavelength division multiplexing optical couplers 18, optical receivers 16 and LEDs 14, 28, respectively, for signal transmission/receipt. The coarse WDM couplers 18 located at the central office multiplex/demultiplex the downstream/upstream signals directed to/from the remote node via fiber 20. Distinct downstream and upstream wavelength bands are chosen to avoid reflection, crosstalk, etc., e.g., 1.3 um and 1.5 um, respectively. The WDM couplers 18 located at the optical network units multiplex/demultiplex the upstream/downstream information transmitted along fiber 24 to/from remote node 22. When used herein, the expressions $\lambda^{dj}$ and $\lambda^{uk}$ describe the downstream and upstream wavelength bands, respectively. The j designation corresponds to ports on the downstream side of remote node 22, and the k designation corresponds to ports on the upstream side of the remote node.

When a downstream signal arrives at remote node 22, the wavelength division multiplexing router (WDM/R) contained therein insures that each downstream port j receives slices of the transmitted signal particular to the optical network unit to which it is directed. The periodicity of the wavelength division multiplexing router (WDM/R) insures that each port j receives a signal containing approximately the same optical power, assuming the wavelength spread of LED 14 is large relative to the router's (WDM/R's) free spectral range (FSR). That is, if there are N optical ports, $\lambda^{dj+mN}$ is the wavelength band that will appear at port j for integers m. If the FSR is small compared to $\Delta\lambda^d$, then each port j receives approximately the same power $P_j$. Each $P_j$ is equal to the scaled central office output power ($P_o$) over N, i.e., $P_j = \alpha P_o/N$, where $\alpha$ is a constant that incorporates various sources of excess loss. In contrast, only $\lambda^{dj}$ will appear at port j in a conventional WDM, i.e., only for m=0, resulting in a lower value of $P_j$.

In the upstream transmission direction, the entire optical signal generated within LED 28 (at each optical network unit 26) is frequency selectively directed via each coarse WDM coupler 18 to the remote node 22. Due to the properties of the WDM/R, remote node 22 combines a sliced version of the LED spectrum generated within each optical network unit onto a single optical fiber and directs it to the central office. The sliced spectra are automatically interleaved such that the optical frequencies from distinct optical network units do not overlap, thereby preventing, for example, unwanted beat noise. Collisions of the signals broadcast from a plurality of optical network units are avoided at the central office by scheduling, by sub-carrier multiplexing (SCM), or by wavelength division multiplexing(WDM). Scheduling is a form of time division multiplexing where, for example, different signals at the same frequency which are transmitted from optical network units are delegated to predefined, calibrated time slots in accordance with a system clock. SCM is an arrangement where optical signals transmitted from each optical network unit or central office 13 are coded into unique RF subcarriers that modulate the LED 28 generated broadband light. By construction of the WDM or WDM/R, the signals are naturally segregated by wavelength and are therefore amenable to demultiplexing using a wavelength division multiplexer. At the central office, the light received from the remote node is either segregated in time, as in the case of scheduling, or segregated by RF frequency, in the case of SCM, or segregated by wavelength band in the case of WDM, and processed accordingly.

Figure 3:
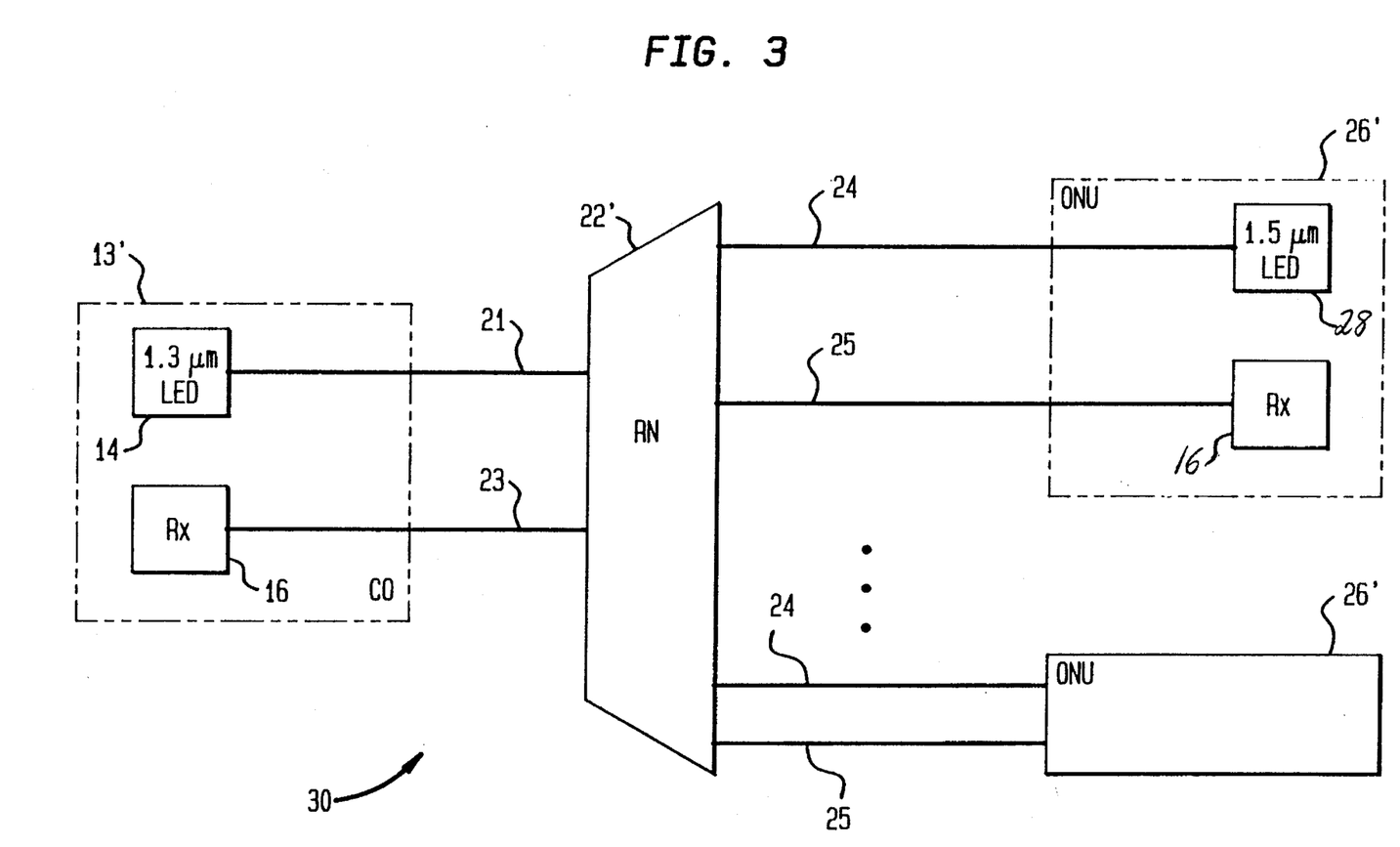
FIG. 3 illustrates another embodiment of the present invention wherein the passive optical network includes at least one central office connected to a remote node via at least two optical fibers.

A second embodiment of this invention, a passive optical network 30, is shown in FIG. 3. Passive optical network 30 includes at least one central office 13' connected to a remote node 22' via at least two optical fibers 21 and 23. Fiber 21 forms a dedicated downstream path between remote node 22' and LED 14, and fiber 23 forms a dedicated upstream path between remote node 22' and receiver 16. On the downstream side of remote node 22', a pair of fibers 24, 25, form dedicated downstream and upstream paths to receiver 16 and LED 28, respectively, thereby connecting the remote node to each of the plurality of optical network units 26'. The coarse WDM couplers 18 that were described above are not required within passive optical network 30 due to the presence of the dedicated upstream 23,25 and downstream 21,24 paths. While the two for one optical fiber requirement for this embodiment reduces the number of users which can be supported by each WDM/R-based remote node 22', implementation of such a network provides a vehicle for the implementation of future technologies directed towards formation of an efficient, high-performance network.

A prototype of passive optical network 30 of FIG. 3 was built and tested at a baseband transmission of 40-Mb/s at various launched power levels. A 4×4 wavelength division multiplexing router (WDM/R) was used at the remote node 22' in the prototype, but connected to only one optical network unit 26' for simplicity in testing. Receiver 16 at optical network unit 26' was implemented with a commercially available AC-coupled PIN FET, which has a minimum optical power rating of −48 dBm at 40 Mb/sec.

Figure 4A:
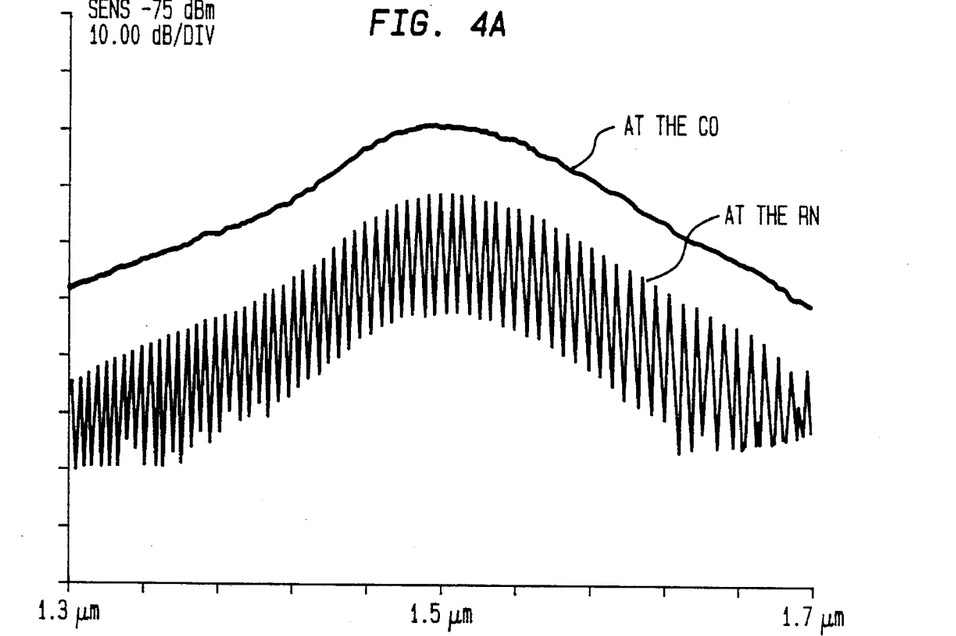
FIGS. 4A and 4B are display photos highlighting the optical spectra captured from an LED within an optical network unit.
Figure 4B:
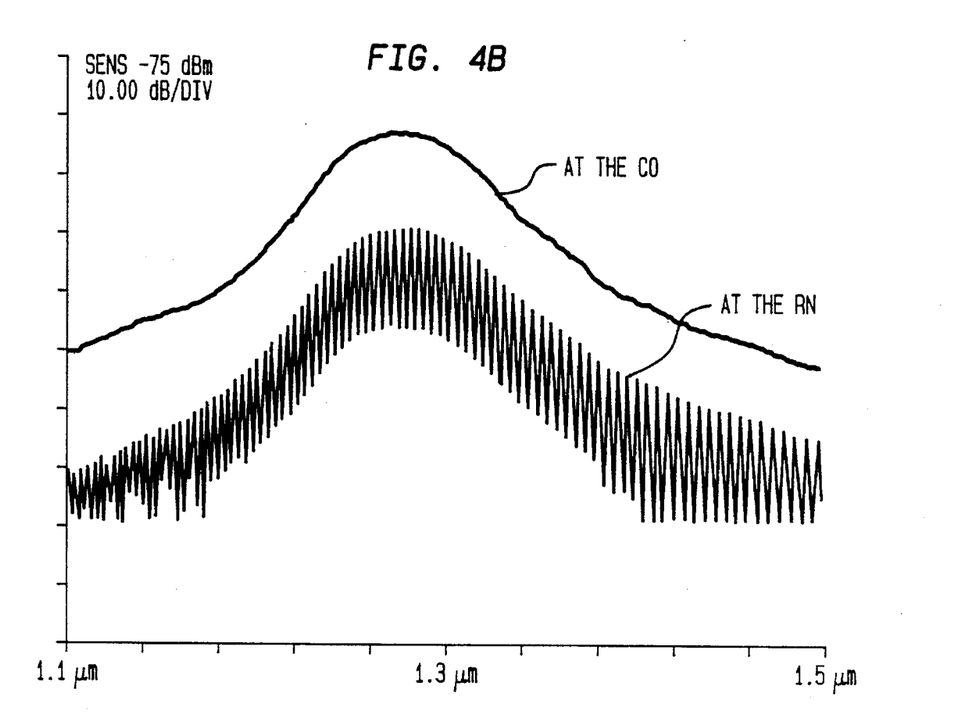

FIGS. 4A and 4B are display photos highlighting the optical spectra captured from LED 28 within optical network unit 26' at a wavelength band of 1.5 μm, and LED 14 within central office 13' at a wavelength band of 1.3 μm, respectively, during prototype testing. The signals generated within the LEDs are shown in each figure both before and after spectral slicing. The LEDs were directly modulated at 100% modulation depth with a non-return-to-zero (NRZ) pseudo-random data stream. Launched powers for each LED were varied from the LED's maximum rated value $P_{L,max}$, down to a value resulting in a detected minimum power required for $1\times10^{-9}$ BER $P_{R,min}$. Electrical crosstalk generated by reflected light impinging on receivers was found to be neglible relative to receiver thermal noise during testing. It can be assumed, therefore, with such an arrangement, that the electrical crosstalk between dedicated upstream and downstream fibers leads to no appreciable performance degradation.

Figure 5A:
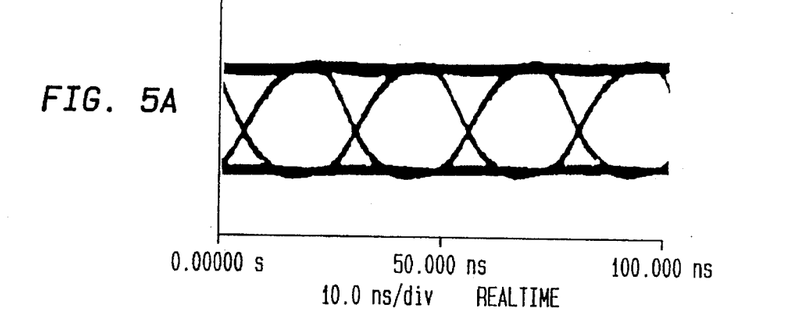
FIGS. 5A, 5B, 6A and 6B show received eye patterns from downstream and upstream transmissions.
Figure 5B:
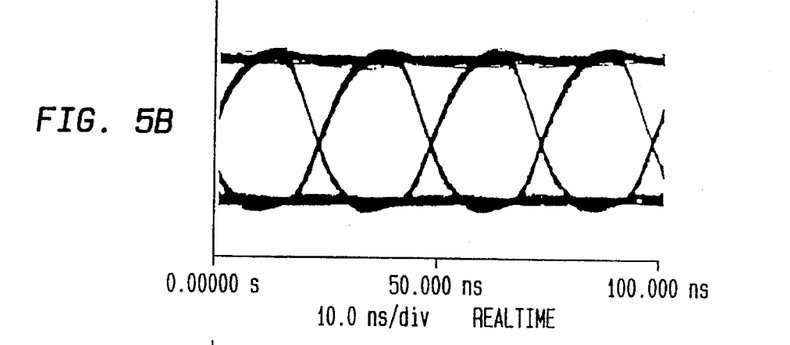

FIGS. 5A and 5B each show received eye patterns for downstream and upstream transmission through the prototype during testing, respectively. Eye patterns are bit-train waveforms seen on a display, the time base of which is typically set to trigger at the bit rate of the transmitted (or broadcast) signal. The shape of the eye pattern gives the viewer an indication of both random (noise) and deterministic variations in the received signal which can give rise to errors. The wide open eyes in these figures are indicative of low error rate operation. The patterns correspond to maximum rated launched power levels of LEDs 14 and 28, respectively. The launched downstream power, $P_{L\ MAX}$, of LED 14 at Co 13' was measured at −13.3 dBm, and the launched upstream power, $P_{L\ MAX}$, of LED 28 at optical network unit 26' was measured at −17.5 dBm. The corresponding received powers were found to be −32.3 dBm and −34.5 dBm, respectively, at the downstream and upstream receivers, respectively.

Figure 6A:
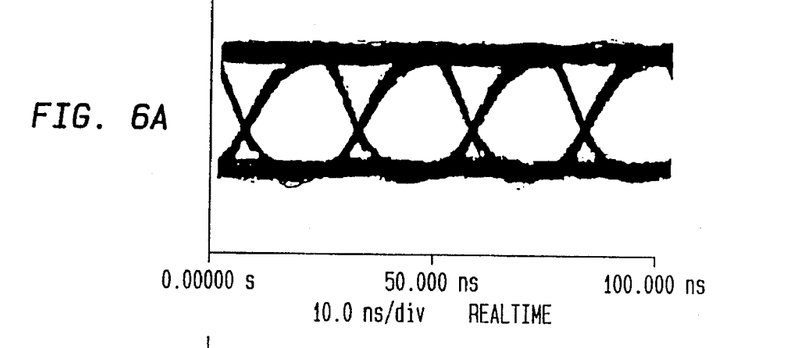
Figure 6B:
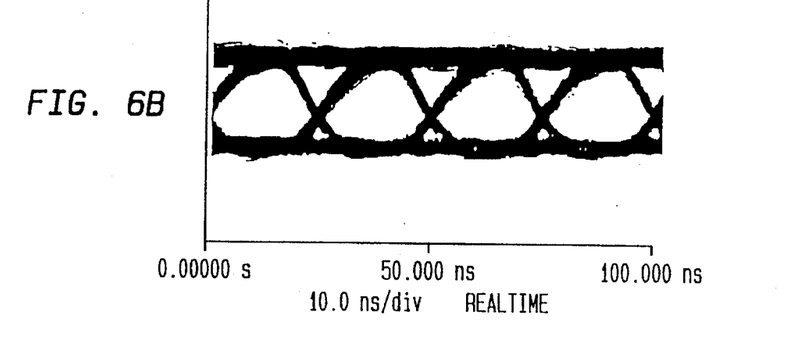

FIGS. 6A and 6B show received eye patterns for downstream and upstream transmissions, respectively, after the launched LED power levels discussed in relation to FIGS. 5A and 5B were decreased by 10 dB within the prototype. The reduction of launched power by 10 dB was found to lower the received power levels to levels commensurate with power losses which would occur during actual field condition transmission. FIGS. 6A and 6B are patterns derived from the wavelength division multiplexing router (WDM/R) at remote node 22' when optimized for 1.5 μm operation. The resulting downstream loss through the network was found to be 19 dB, exceeding the total upstream loss of 17 dB by 2 dB. Six (6) of the 17 dB are due to the 1×4 split. Of the remaining 11 dB loss, 1 dB results from the connector and 10 dB from the wavelength division multiplexing router, i.e., 3 dB from chip loss, 2 dB from pigtails, 1 dB from polarization and 4 dB as a result of the filter function.

Figure 7A:
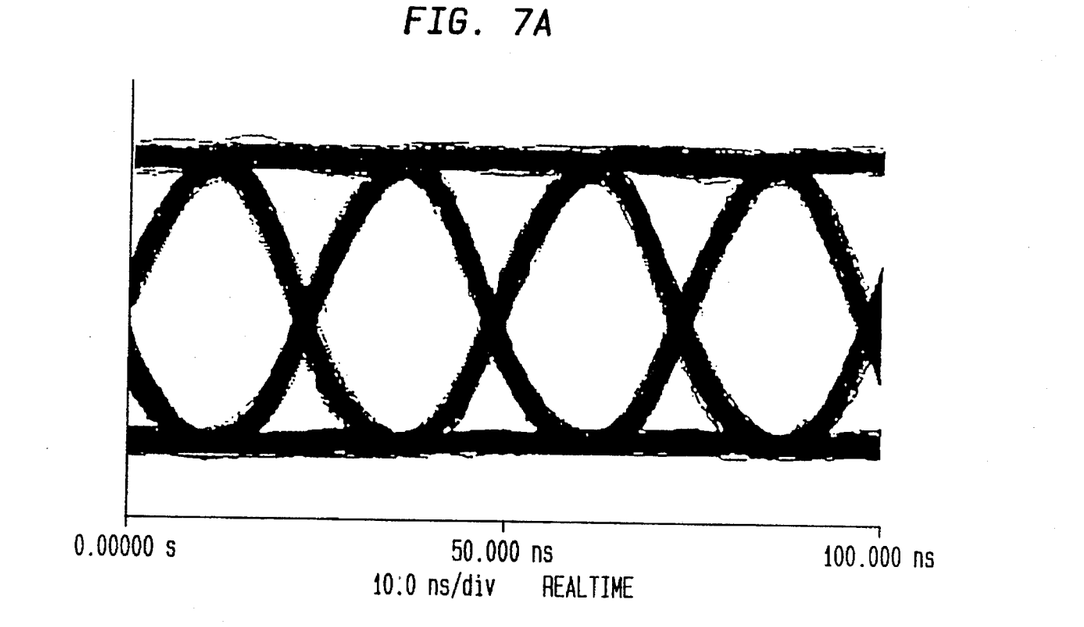
FIGS. 7A and 7B show test results of a prototype in accordance with the present invention.
Figure 7B:
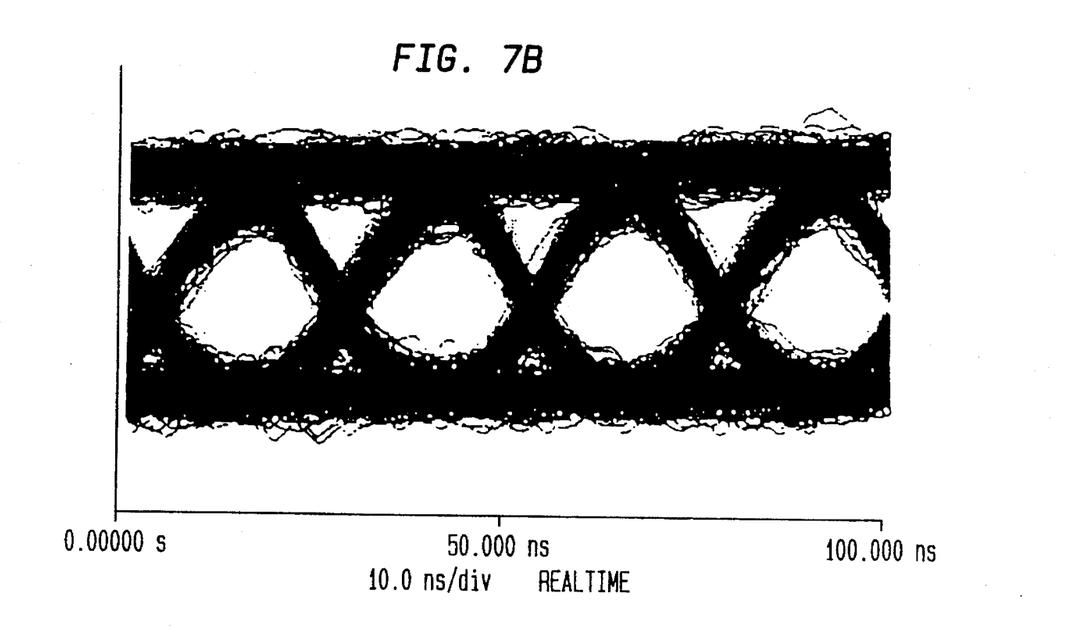

While power loss within transmitted signals is particularly relevant, another factor critical to transmission within a passive optical network is chromatic dispersion. In order to identify signal degradation due to chromatic dispersion, the upstream and downstream prototype transmission paths were implemented in the prototype with conventional single mode fibers that display a zero-dispersion value at 1.3 μm, i.e., λo equals 1.3 μm. At 1.5 μm transmission, the dispersion value was found to be 16 ps/(nm-km). FIGS. 7A and 7B show the combined effects of loss and dispersion, due to transmission through 8 km of the conventional signal mode fiber in the upstream and downstream directions, respectively, within the prototype. The launched powers were equal to −17.5 dBm and dBm −13.3 dBm, respectively. As the tests results indicate, the eyes remained open, with only slight evidence of distortion due to chromatic distortion, as seen in a comparison of the figures.

It follows that a passive optical network architecture defined according to this invention provides a number of advantages over the prior art, most importantly, system implementation cost reductions. Because dedicated LEDs may be used for transmitting in both directions, the need for sources such as lasers operating at a discrete set of frequencies is avoided at both the central office and optical network units, and the need for modulators is avoided at the optical network units. Active components, e.g., LEDs and baseband receivers, which are readily available commercially at low cost, may be used in the network. Another benefit is the predicted ease with which the network architecture may be incrementally upgraded to incorporate advanced RITE-Net™ or LAR-Net™ features. Implementation of the passive optical network architecture described herein, therefore, promises a cost effective means for deploying fiber in the loop.

What has been described herein is merely illustrative of one or more particular applications of the principals of the present invention. Other arrangements and methods may be implemented, however, by those skilled in the art without departing from the scope or spirit of this invention.

What is claimed is:

1. A passive optical network utilizing bi-directional optical spectral slicing, comprising:
   a) a central office for transmitting/receiving optical information;
   b) a remote node including a plurality of input/output ports, said remote node being optically linked to said central office for routing said optical information by wavelength band to and from each of said input/output ports utilizing bi-directional optical spectral slicing, the bi-directional optical spectral slicing providing each of said input/output ports with multiple optical wavelength bands, the remote node having a periodicity property for transmitting substantially equal optical power to each of the input/output ports; and
   c) at least one optical network unit optically linked to a corresponding input/output port of said remote node, said optical network unit transmitting/receiving said optical information, wherein said central office transmits optical information as downstream data signals to said remote node, and said remote node optically routes said downstream data signals through the input/output ports and to the corresponding optical network units, each optical network unit receiving multiple wavelength bands, and wherein each said optical network unit transmits optical information as upstream data signals to said remote node, the optical information from each optical network unit being optically routed through the corresponding input/output port according to wavelength bands and combined to prevent spectral overlap of said upstream data signals, the combined upstream data signals being routed to said central office.

2. The passive optical network defined by claim 1, wherein said remote node includes a wavelength division multiplexing routing coupler (WDM/R).

3. The passive optical network defined by claim 2, wherein said central office and said optical network unit include an incoherent optical signal source and an optical signal receiver.

4. The passive optical network defined by claim 3, wherein said central office is optically linked to said remote node, and said remote node is optically linked to said optical network unit, via single fiber paths for two-way transmission.

5. The passive optical network defined by claim 4, wherein said optical network unit and said central office each include coarse wavelength division multiplexing means.

6. The passive optical network defined by claim 4, wherein said fiber is a single mode fiber.

7. The passive optical network defined by claim 1, wherein said remote node is optically linked to said central office and said optical network unit, respectively, via a single upstream and a single downstream fiber.

8. The passive optical network defined by claim 7, wherein each fiber is a single mode fiber.

9. The passive optical network defined by claim 1, wherein said incoherent optical signal source at said central office operates at a different wavelength band than the wavelength band of said optical network units.

10. The passive optical network defined by claim 1, wherein each said optical network unit includes means for RF subcarrier modulating said upstream data signals and said central office includes means for segregating said received upstream data signals according to RF sub-carrier frequency.

11. The passive optical network defined by claim 1, wherein each said optical network unit includes means for time scheduling said upstream data signals and said central office includes means for time segregating said received upstream data signals according to time.

12. The optical network according to claim 1, wherein the multiple optical wavelength bands at each said input/output port are different, such that a different set of multiple wavelength bands is transmitted from said remote node to each of said optical network units.

13. A method for optically linking a central communications location and at least one remote communications location in which optical data signals transmitted to/from said central location and to/from said remote location, respectively, are spectrally sliced, comprising the steps of:
   a) first transmitting downstream optical data signals and receiving upstream optical data signals at said central location, through at least one optical input/output port provided at said central location;
   b) second transmitting downstream optical data signals and receiving upstream optical data signals at said remote location; and
   c) third routing the upstream optical data signals and the downstream optical data signals to/from said central location and to/from said remote location, wherein said step of routing includes bi-directional optical spectral slicing said optical data signals into wavelength bands such that said central location optically routes said downstream optical data signals through the optical input/output ports and to corresponding remote locations, each optical input/output port routing multiple wavelength bands and the remote location having a periodicity property for transmitting substantially equal optical power to each of the input/output ports, wherein the upstream optical data signals from said remote locations are routed through the corresponding input/output ports according to wavelength bands and combined to prevent spectral overlap of the upstream optical data signals, the combined upstream data signals being routed to the central location.

14. The method of claim 13, wherein said step of first transmitting includes generating said optical data signals with an incoherent light signal source.

15. The method of claim 13, wherein said step of second transmitting includes generating said optical data signals with an incoherent light signal source.

16. The method of claim 13, wherein said steps of first and second transmitting includes transmitting said signals via two-way, single fiber paths.

17. The method of claim 16, wherein said steps of first and second transmitting includes transmitting in different wavelength bands.

18. An optical communications system, comprising:
   a central office for transmitting downstream optical information contained within a broad optical wavelength band; and
   a remote node optically coupled to the central office for receiving the downstream optical information, and having a plurality of output ports for transmitting the downstream optical information to a corresponding plurality of optical network units, said remote node having means including a periodicity property for placing the downstream information into a different, multiple wavelength band set at each of said output ports, with substantially equal optical power contained within each of the multiple band sets, and with the wavelength bands within a given multiple band set being periodically spaced from each other.

19. The optical communication system according to claim 18, further including means at said subscriber terminals for transmitting upstream optical information to said remote node in a broad optical band, wherein said remote node includes means for spectrally slicing said upstream optical information, combining the spectrally sliced information to prevent spectral overlap of the upstream information, and transmitting the combined upstream information to the central office.

* * * * *